April 22, 1958

J. H. MacNEILL 2,831,678

ELECTROSTATIC TAPE DRIVE

Filed Dec. 28, 1954

2 Sheets-Sheet 1

INVENTOR.
JOHN H. MacNEILL

BY James S. Shannon
AGENT
and
Wade Koontz
ATTORNEY

INVENTOR.
JOHN H. MacNEILL

BY James S. Shannon
Wade Koontz AGENT
ATTORNEY

United States Patent Office 2,831,678

Patented Apr. 22, 1958

2,831,678

ELECTROSTATIC TAPE DRIVE

John H. MacNeill, Melbourne, Fla., assignor to Soroban Engineering, Inc., Melbourne, Fla., a corporation of Florida Application December 28, 1954, Serial No. 478,216

15 Claims. (Cl. 271—2.3)

(Granted under Title 35, U. S. Code (1952), sec. 266)

The invention described herein may be manufactured and used by or for the United States Government for governmental purposes without payment to me of any royalty thereon.

This invention relates to magnetic tape recorder-reproducer devices and particularly to the tape drive mechanisms thereof. The invention is of particular value in magnetic tape devices used in conjunction with automatic digital computers.

Magnetic tape recorder-reproducers are employed with digital computers as intermediate speed large capacity storage devices for programs and data, as high speed input devices for information previously recorded on magnetic tape, as output devices, serving as intermediaries between the high speed output of the computer and slower speed recorders such as printers or perforators, and for other purposes.

When a tape recorder-reproducer is used as a storage or memory device for a high speed computer it is essential that the access time to any particular information block or cell on the tape be reduced to an absolute minimum. This requires high tape speeds, high tape accelerations and a maximum utilization of the storage space on the tape so as to reduce tape length to a minimum. Since both the time and tape consumed in accelerating to operating speed are wasted, the rate of acceleration also has a direct bearing on the degree of tape utilization and hence on the access time.

It is accordingly the object of this invention to provide a tape drive mechanism capable of high tape speeds and high tape accelerations. The tape drive described herein is capable of a speed of 120 inches per second and is capable of reaching this speed, or of stopping from it, in a period of time of the order of 0.25 millisecond.

Briefly, the drive comprises forward and reverse capstans located on opposite sides of the recording head and rotating continuously at constant speed, and a clutching means at each capstan for bringing the tape into frictional engagement with one or the other of the capstans depending upon the drive direction desired. Each clutching means comprises a stationary arc-shaped belt support positioned adjacent to a substantial portion, 90° or more, of the capstan driving surface and carrying a light endless belt fitted with sufficient looseness to slide easily around the belt support. The spacing between the belt support and capstan is just enough to permit free movement of the belt and tape therebetween. The belt, which is made of a flexible conductive material such as conductive rubber, and the capstan form in effect the two electrodes of a condenser having the tape as the dielectric. The clutch is engaged by applying a high direct voltage between the capstan driving surface and the belt support, the resulting electrostatic force between the belt, which is in contact with the support, and the capstan forcing the tape into contact with the capstan and causing it to be driven thereby. During clutch engagement the belt travels freely around the belt support at tape speed.

An electrostatic brake acting on the tape is also provided adjacent to each capstan. The brakes are similar in principle to the clutches, each comprising a flat stationary brake shoe and an anchored flexible brake band of conductive material such as that used for the clutch belt. The tape passes between the band and the shoe which form the electrodes of a condenser, again with the tape as the dielectric. The electrostatic force between the band and shoe when a high voltage is applied forces the tape into frictional engagement with the shoe and brings it to a quick stop. By avoiding the necessity for accelerating the capstans and by providing substantially inertialess clutches and brakes, very high accelerations and decelerations are obtained. A further advantage of the design is that, in both the clutch and the brake, pressure is applied to the tape over a comparatively large area so that high unit pressures and possible tape damage resulting therefrom are avoided.

A more detailed description of the invention will be given in connection with the specific embodiment thereof shown in the accompanying drawings, in which Fig. 1 is a schematic illustration of the electrostatic tape drive and associated apparatus;

Figure 1:
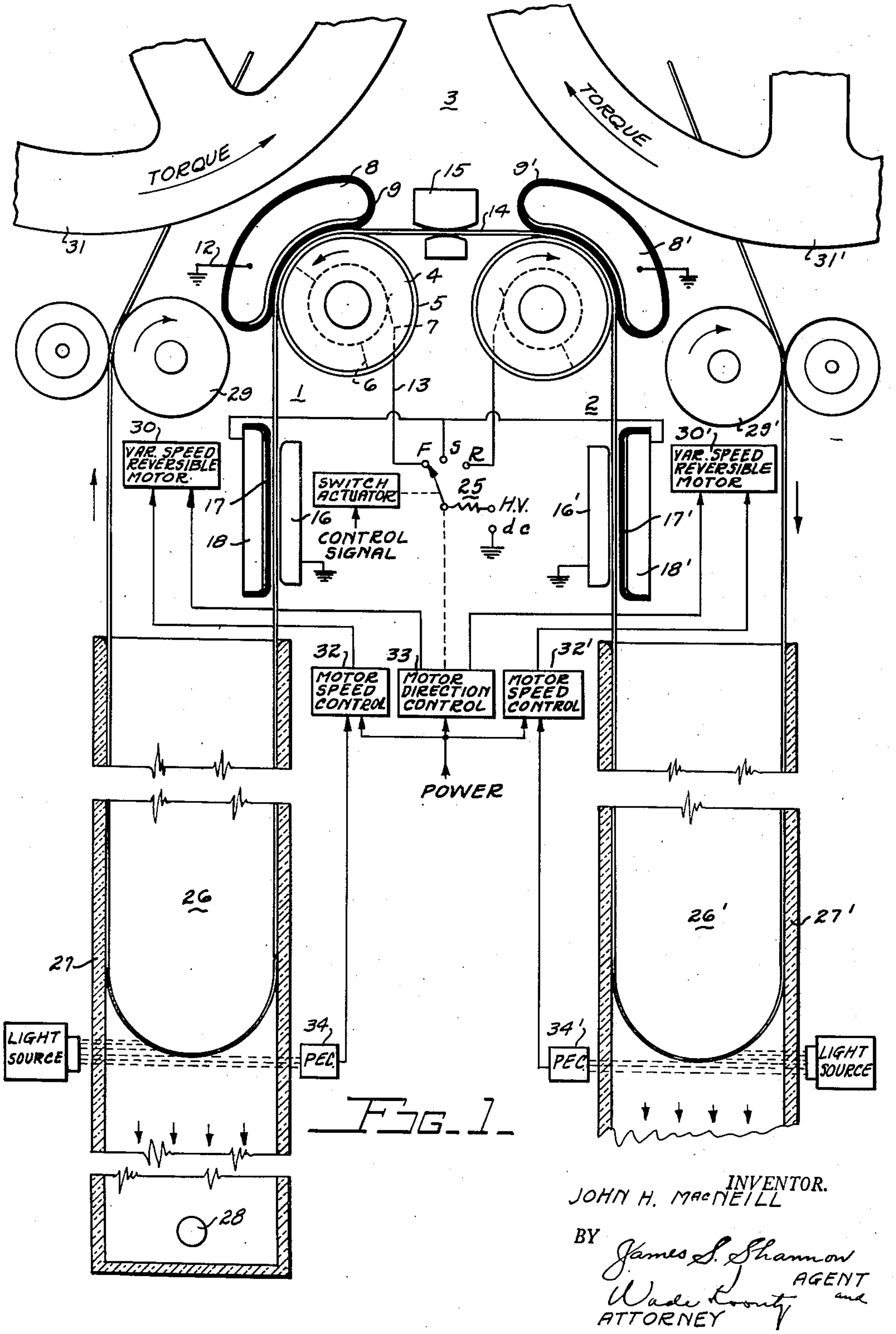
Figure 3:
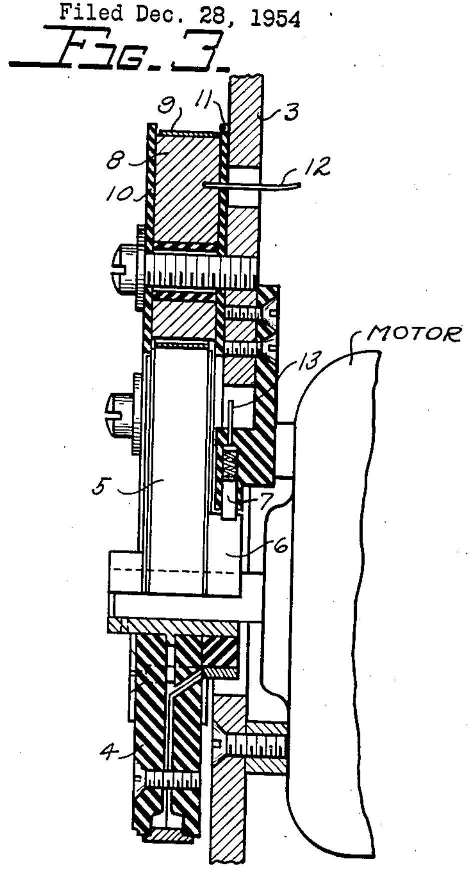
Fig. 3 shows the details of the capstan and clutch belt support.

Referring to Fig. 1, forward capstan 1 and reverse capstan 2 are driven continuously in opposite directions at constant speeds by motors located behind panel 3. The two capstans are identical each having a body 4 of insulating material which carries a metal tire 5 giving it a rigid conductive driving surface and a slip-ring 6 connected to the tire and contacted by brush 7. The structural details of the capstan are shown in Fig. 3.

A metallic clutch belt support 8 is mounted on the panel and is surrounded by an endless belt 9 which is fitted to the belt support with only enough slack to permit its free movement around the support. The outer surface of the support 8 over which the belt travels is polished to reduce friction to a minimum. The belt is made of a flexible conductive material, such as conductive rubber, and although shown as comparatively heavy in Fig. 1 for illustrative purposes, is actually made as light as possible and has more nearly the proportions shown in Fig. 3. Also, as seen in Fig. 3, the support 8 is bounded by flanges 10 and 11 which serve as belt guides. The flanges are preferably made of insulating material because of their closeness to tire 5 of the capstan. Lead 12 provides a means for making an electrical connection to the metal support 8, and lead 13 provides a means for making an electrical connection through brush 7 and slip-ring 6 to tire 5.

The tape 14, which is made of a dielectric material such as paper or plastic with a magnetic coating on one side, passes over capstans 1 and 2 beneath belts 9 and 9' and, between the capstans, passes beneath recording-reproducing head 15. The spacing between belt support 8 and tire 5 is made as close as possible while still permitting free movement of the belt and tape occupying the space. It will be apparent that application of a direct voltage between leads 12 and 13 will result in a voltage between belt 9, which contacts support 8, and tire 5. The belt is therefore attracted to the tire by an electrostatic force that is directly related to the applied voltage and inversely related to the tape thickness. This force urges the tape into frictional engagement with the capstan and causes it to be driven thereby. At the same time, frictional engagement between the belt and the tape causes the belt to circulate about support 8 at tape speed.

Figure 2:
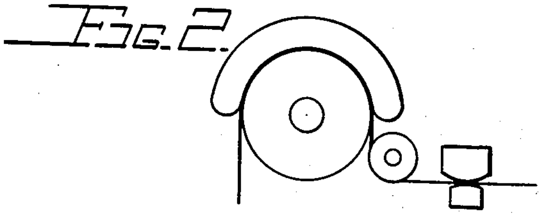
Fig. 2 illustrates a modification of Fig. 1.

The unit pressure required to drive the tape without slippage depends upon the area of tape between the belt and the capstan. In Fig. 1 pressure is exerted over 90° of the capstan and because of this relatively large area the unit pressure may be made relatively low and damage to the tape in accelerating it to capstan speed thereby avoided. Pressure may be applied over still greater portions of the capstan if found necessary, Fig. 2, for example, showing pressure applied over 180° of the capstan. The required unit pressure, which as stated above depends upon the area over which pressure is applied, and the tape thickness determine the voltage required to operate the clutch. For an arrangement such as shown in Fig. 1 the required potential is of the order of 1000 volts.

When the clutch is deenergized there is no attraction between the belt and the capstan. Under this condition the tape may be stationary or it may be driven in the opposite direction by the other capstan. In either case there is relative motion between the tape and the capstan, which rotates continuously, and in the latter case between the tape and both the capstan and the belt. However, it has been found that at the high operating speeds employed a film of air is formed between the relatively moving surfaces so that the tape at least partially floats on an air cushion above the capstan and the belt similarly floats above the tape when the latter is in motion. Because of this cushioning effect no damage is done to the tape when the clutch is deenergized and the tape is free to be driven by the other capstan.

The operation of the electrostatic drive associated with reverse capstan 2 is identical to that described above for forward capstan 1.

In order to provide deceleration of the tape at a rate matching its acceleration by the above described tape drive a pair of brakes operating directly on the tape are provided near the capstans 1 and 2. The brakes are identical each comprising a brake shoe 16, a brake band 17 and a brake band anchor 18. The tape passes between the band and the shoe, the clearance here being just sufficient to allow free movement of the tape. The operation is similar to that of the tape drive. The application of a direct voltage between the brake band, which is made of a flexible conductive material such as conductive rubber, and the brake shoe results in an electrostatic force between these elements that clamps the tape between the band and shoe, stopping its motion.

Figure 4:
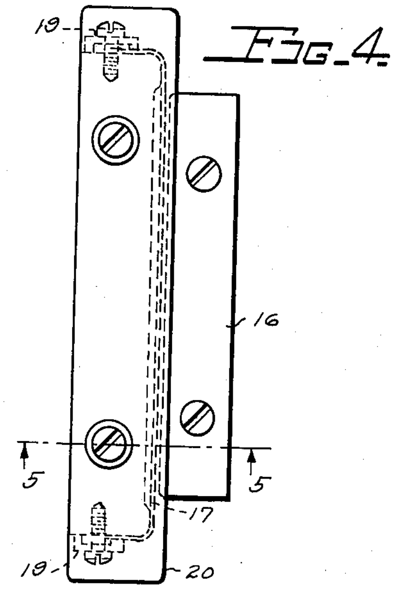
Figs. 4 and 5 show the details of one brake design.
Figure 5:
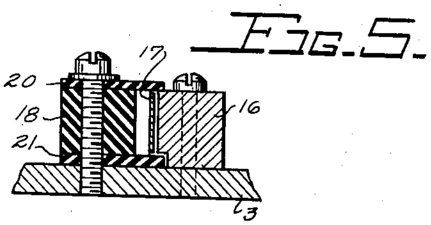
Figure 6:
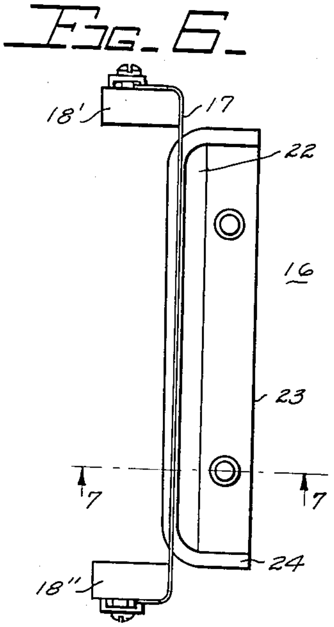
Figs. 6 and 7 show the details of another brake design.
Figure 7:
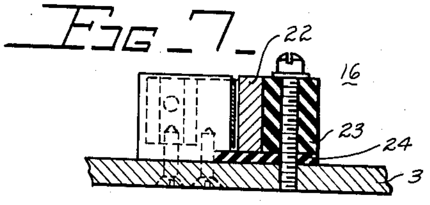

Suitable designs of the brake are shown in Figs. 4–5 and Figs. 6–7. In Figs. 4–5 the shoe 16 is grounded to the panel 3 while the brake band 17 is insulated therefrom. The brake band anchor 18 is made of insulating material and has the band clamped thereto as by clamps 19 shown in Fig. 4. Flanges 20 and 21, also made of insulating material, serve as guides for the tape. The operating potential may be applied between the panel 3 and one of the clamps 19. In Figs. 6–7 the brake shoe 16 is insulated from the panel while the brake band 17 is grounded thereto. The shoe is composed of a metallic face member 22 supported by a body 23 of insulating material and isolated further from the panel by insulating plate 24. The brake band anchor in this case consists of a pair of metal holders 18′ and 18″ supported on the panel and in electrical contact therewith. The band is clamped to the holders. The operation potential is applied between face piece 22 and the metal panel 3. In both cases the shoe 16 provides a fixed rigid conductive surface adjacent to the tape and the brake band anchor restricts movement of the band except in a direction normal to this surface.

Referring again to Fig. 1, the tape drive mechanism is controlled by switch 25. In the position shown, high voltage is applied through the F contact and ground to the electrostatic clutch associated with forward capstan 1, causing the tape to be driven in the forward direction. Movement of the switch to the S contact releases the electrostatic clutch at capstan 1 and energizes both brakes, stopping the tape. Movement of the switch to contact R releases both brakes and energizes the electrostatic clutch associated with reverse capstan 2, causing the tape to be driven in the reverse direction. While switch 25 is shown only in schematic form, in actual practice it should be a switch capable of changing its position with great rapidity in response to an electrical control signal. Since the electrostatic clutches and brakes shown have substantially zero inertia and since there is no starting or stopping of the capstans required, these features combined with a rapidly acting switch are capable of providing almost instantaneous transitions between the conditions of stationary tape, operating speed in the forward direction and operating speed in the reverse direction.

In tape drive systems in which high accelerations are required it is necessary to isolate the driven section on the tape from the inertia of the storage reels. This is done conventionally in Fig. 1 by providing loops of tape on either side of the drive mechanism, by providing means for maintaining constant tension on the tape, and by providing further means for maintaining substantially constant loop lengths and for restoring these lengths when they are temporarily disturbed by starting and stopping of the tape drive mechanism.

Referring to the left side of Fig. 1, the loop 26 is contained in a well 27 of rectangular cross section having substantially the same width as the tape so that the loop seals the open end of the well. The air pressure in the well below the loop is maintained at a constant value less than atmospheric by an exhaust pump connected to opening 28 in the bottom of the well. The difference in pressures above and below the loop, therefore, results in a constant downward pressure on the loop and constant tension in the tape regardless of the loop length. Tape is supplied to or taken from the loop as required by means of capstan 29 driven by variable speed reversible motor 30, the storage reel 31 having constant wind-up torque applied at all times. The motor receives its energization through motor speed control 32 and motor direction control 33, the former being controlled by the output of photoelectric cell 34 and the latter being operated in conjunction with switch 25. Assuming operation in the forward direction as shown in Fig. 1, capstan 29 is driven in such direction as to pass tape from the loop to the reel 31. Should the loop tend to increase in length, less light would fall on photocell 34 causing speed control 32 to increase the speed of motor 30 and shorten the loop. Similarly, a tendency for the loop to become too short would be countered by a decrease in motor speed. If switch 25 is actuated to the S contact the motor direction control 33 deenergizes motor 30, and if actuated to the R position it reverses the direction of motor 30. The motor direction control also acts on the speed control 32 to reverse the sense of this control when the direction of motor rotation is reversed. The loop control mechanism for the right side of Fig. 1 is the same in all respects as that described above for the left side and its components have corresponding primed reference numerals.

The capstans 29 and 29′ of necessity have lower acceleration and deceleration rates than the tape drive mechanism. Therefore disturbances of loop lengths occur when the tape drive mechanism is started or stopped, the disturbances being cumulative when the direction of tape drive is changed. The range of speed variations of these capstans, however, extends from a speed below operating tape speed to a speed above operating tape speed. Therefore any change in loop length resulting from acceleration or deceleration of the tape by the tape drive mechanism is rapidly corrected by the loop control mechanism after tape operating speed is reached.

I claim:

1. Apparatus for rapidly changing the velocity of a dielectric tape to a desired velocity comprising means providing next to one side of said tape a rigid conductive surface having said desired velocity, a flat flexible conductor having fixed support means and situated next to the other side of said tape opposite at least a portion of said surface and actuatable toward said surface, and means for applying a direct voltage between said flexible conductor and said surface of sufficient magnitude for said flexible conductor to force said tape into frictional engagment with said surface.

2. Apparatus as claimed in claim 1 in which said flexible conductor is movable at the velocity of said surface.

3. Apparatus as claimed in claim 1 in which said flexible conductor is an endless belt which is freely movable around said fixed support means.

4. A tape drive mechanism for a flexible elongated movable tape, comprising at least one first conductive member disposed on one side of said tape, at least one second conductive member disposed on the other side of said tape in opposition to at least a portion of said first conductive member, said second conductive member actuatable into contact with said tape, means for relatively moving said tape and at least one of said conductive members and means for mechanically coupling said tape to at least one of said conductive members, said last means including means for applying a direct voltage between said first and second conductive members of magnitude adequate to actuate said second conductive member into contact with said tape, whereby to clamp said tape between said conductive members.

5. The combination in accordance with claim 4 wherein said first conductive member comprises a continuously rotating cylindrical member.

6. The combination in accordance with claim 5 wherein said second conductive member comprises a conductive endless belt having a portion thereof movable parallel with and in juxtaposition to said tape.

7. The combination in accordance with claim 4 wherein said first conductive member and said second conductive members are stationary members.

8. A tape drive mechanism for a flexible elongated, movable tape, comprising at least one first conductive member disposed on one side of said tape, at least one second conductive member disposed on the other side of said tape in opposition to at least a portion of said first conductive member, said second conductive member actuatable toward said portion of said first conductive member, means for relatively moving said tape and one of said conductive members and means for mechanically coupling said tape to at least one of said conductive members, said last means including means for applying a direct voltage between said first and second conductive members of magnitude adequate to actuate said second conductive member toward said first conductive member to thereby clamp said tape between said conductive members.

9. A tape drive mechanism for a flexible elongated, movable tape, comprising at least one first conductive member disposed on one side of said tape, at least one second conductive member disposed on the other side of said tape in opposition to at least a portion of said first conductive member, said second conductive member actuatable toward said portion of said first conductive member, means for relatively moving said tape and said first conductive member and means for mechanically coupling said tape to said first conductive member, said last means including means for applying a direct voltage between said first and second conductive members of magnitude adequate to actuate said second conductive member toward said first conductive member to thereby clamp said tape between said conductive members.

10. A tape drive mechanism comprising an electrically conductive continuously rotating capstan having a driving surface a portion of which is in slidable contact with one side of said tape, a flexible electrically conductive endless belt, a fixed conductive support extending through the loop of said belt and positioning said belt relative to said capstan so that a portion of the belt is actuatable into contact with the other side of said tape within the limits of that part of the tape in contact with the capstan driving surface, said belt being freely movable about said support in sliding contact therewith, and means including said support for applying a direct voltage between said belt and said capstan.

11. A drive mechanism for a dielectric tape comprising an electrically conductive continuously rotating capstan having a driving surface a portion of which is in slidable contact with one side of said tape, a flexible electrically conductive endless belt, a fixed support extending through the loop of said belt and positioning said belt relative to said capstan so that a portion of the belt is actuatable into contact with the other side of said tape within the limits of that part of the tape in contact with the capstan driving surface, said support restricting movement of said belt substantially to movement around said support and normal to said capstan driving surface, and means for applying a direct voltage between said belt and said capstan.

12. A tape braking mechanism comprising an electrically conductive brake shoe having a braking surface situated adjacent to one side of said tape, a flexible electrically conductive brake band, brake band anchor means positioning said brake band adjacent to the other side of said tape opposite said braking surface and restricting movement of said band except in a direction normal to said braking surface, said brake band being actuatable toward said braking surface to the extent necessary to clamp the tape between the brake band and the braking surface, and means for applying a direct voltage between said band and said braking surface for actuating the band toward the braking surface.

13. In a tape recorder-reproducer having a recording-reproducing head in operative relation to a tape, a drive mechanism for said tape comprising an electrically conductive forward capstan and an electrically conductive reverse capstan driven at constant speeds in opposite directions, said capstans having electrically conductive driving surfaces, a portion of the driving surface of one capstan being in slidable contact with one side of said tape on one side of said head and a portion of the driving surface of the other capstan being in slidable contact with one side of said tape on the other side of said head, a pair of flexible electrically conductive endless belts, fixed supports extending through the loops of said belts and positioning said belts relative to said capstans so that a portion of each belt is actuatable into contact with the other side of said tape within the limits of that part of the tape in contact with the driving surface of the associated capstan, said supports restricting movement of said belts substantially to movement around said supports and normal to said capstan driving surfaces, and drive control means for selectively applying a direct voltage between either of said capstans and the belt associated therewith.

14. Apparatus as claimed in claim 13 in which a tape braking means is provided on each side of said recording-reproducing head, each of said braking means comprising an electrically conductive brake shoe having a braking surface situated adjacent to one side of said tape, a flexible electrically conductive brake band, brake band anchor means positioning said brake band adjacent to the other side of said tape opposite said braking surface and restricting movement of said band except in a direction normal to said braking surface, said brake band being actuatable toward said braking surface to the extent necessary to clamp the tape between the brake band and the braking surface, and brake control means operatively associated with said drive control means and operative at substantially the instant of removal of voltage from between either of the forward and reverse capstans and its associated belt to apply a direct voltage between the band and brake shoes of each braking means, and operative at substantially the instant of application of voltage between either of said forward and reverse capstans and its associated belt for removing the direct voltage applied to said braking means.

15. Apparatus as claimed in claim 14 in which said braking means are situated on the opposite sides of said capstans from said recording-reproducing head.

References Cited in the file of this patent

UNITED STATES PATENTS

| | | |
|---|---|---|
| 1,155,727 | Harwood | Oct. 5, 1915 |
| 2,235,029 | Levinson | Mar. 18, 1941 |
| 2,369,089 | Thomas | Feb. 6, 1945 |
| 2,576,882 | Koole et al. | Nov. 27, 1951 |